United States Patent
Moroney et al.

(10) Patent No.: US 10,891,782 B2
(45) Date of Patent: Jan. 12, 2021

(54) DETERMINING ILLUMINATION DIRECTION WITH THREE-DIMENSIONAL ILLUMINATION CHARTS

(71) Applicant: Hewlett-Packard Development Company, L.P., Houston, TX (US)

(72) Inventors: Nathan Moroney, Palo Alto, CA (US); Ingeborg Tastl, Palo Alto, CA (US); Melanie M. Gottwals, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/098,102

(22) PCT Filed: Jul. 26, 2016

(86) PCT No.: PCT/US2016/044065
§ 371 (c)(1),
(2) Date: Oct. 31, 2018

(87) PCT Pub. No.: WO2018/022017
PCT Pub. Date: Feb. 1, 2018

(65) Prior Publication Data
US 2019/0147644 A1    May 16, 2019

(51) Int. Cl.
*G06T 15/50* (2011.01)
*G03B 43/00* (2006.01)
(Continued)

(52) U.S. Cl.
CPC ............... *G06T 15/50* (2013.01); *G01J 1/02* (2013.01); *G03B 15/02* (2013.01); *G03B 43/00* (2013.01); *G06K 9/2036* (2013.01); *G06K 9/4661* (2013.01)

(58) Field of Classification Search
CPC ........ G06T 15/50; G03B 43/00; G03B 15/02; G01J 1/02; G06K 9/2036; G06K 9/4661
See application file for complete search history.

(56) References Cited

U.S. PATENT DOCUMENTS 4,789,234 A    12/1988  Ginsburg et al.
5,733,711 A *   3/1998  Juengling ............. G03F 7/7045
                                                   430/312
(Continued)

FOREIGN PATENT DOCUMENTS

EP    0050474     4/1982
EP    1620843     1/2006
(Continued)

OTHER PUBLICATIONS

Wehrwein; "Shadow Detection and Sun Direction in Photo Collections"; Apr. 7, 2016; http://www.cs.cornell.edu/projects/shadows/files/wehrwein3dv15_shadows.pdf.

*Primary Examiner* — Saptarshi Mazumder
(74) *Attorney, Agent, or Firm* — Fabian VanCott

(57) ABSTRACT

In one example in accordance with the present disclosure a three-dimensional illumination chart is described. The chart includes a substrate divided into a number of portions. Each portion includes a raised relief pattern disposed thereon having a relief angle relative to a reference line. Each relief angle of the raised relief patterns of the number of portions is different from other relief angles of other raised relief patterns of other of the number of portions.

19 Claims, 5 Drawing Sheets

(51) Int. Cl.
*G01J 1/02* (2006.01)
*G03B 15/02* (2006.01)
*G06K 9/20* (2006.01)
*G06K 9/46* (2006.01)

(56) References Cited

U.S. PATENT DOCUMENTS

| | | | |
|---|---|---|---|
| 7,696,995 B2 * | 4/2010 | McTaggart | G06T 15/506 |
| | | | 345/426 |
| 8,218,903 B2 | 7/2012 | Osman | |
| 2005/0248571 A1 | 11/2005 | McTaggart | |
| 2008/0285261 A1 * | 11/2008 | Ratmansky | G09F 13/22 |
| | | | 362/154 |
| 2009/0208108 A1 | 8/2009 | Shimano et al. | |
| 2014/0327673 A1 | 11/2014 | Sousa | |
| 2015/0109646 A1 * | 4/2015 | Yokozawa | H04N 1/0009 |
| | | | 358/500 |
| 2015/0166844 A1 * | 6/2015 | Clarke | B29B 11/12 |
| | | | 428/43 |
| 2017/0297361 A1 * | 10/2017 | Nagano | B42D 25/373 |

FOREIGN PATENT DOCUMENTS

| | | |
|---|---|---|
| GB | 2337170 | 3/2000 |
| JP | 2008107087 | 5/2008 |
| JP | 2012247743 A | 12/2012 |

\* cited by examiner

DETERMINING ILLUMINATION DIRECTION WITH THREE-DIMENSIONAL ILLUMINATION CHARTS

BACKGROUND

In photography and digital arts, accurate lighting information is valuable to ensuring a quality finished product. Properly using and manipulating lighting can make a difference between a great picture and a good picture. Illumination charts are used to characterize the color reproduction of imaging systems. Illumination charts can also in some instances attempt to characterize an illuminant. For example photographers and digital artists use color charts to test the reproduction of various colors.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
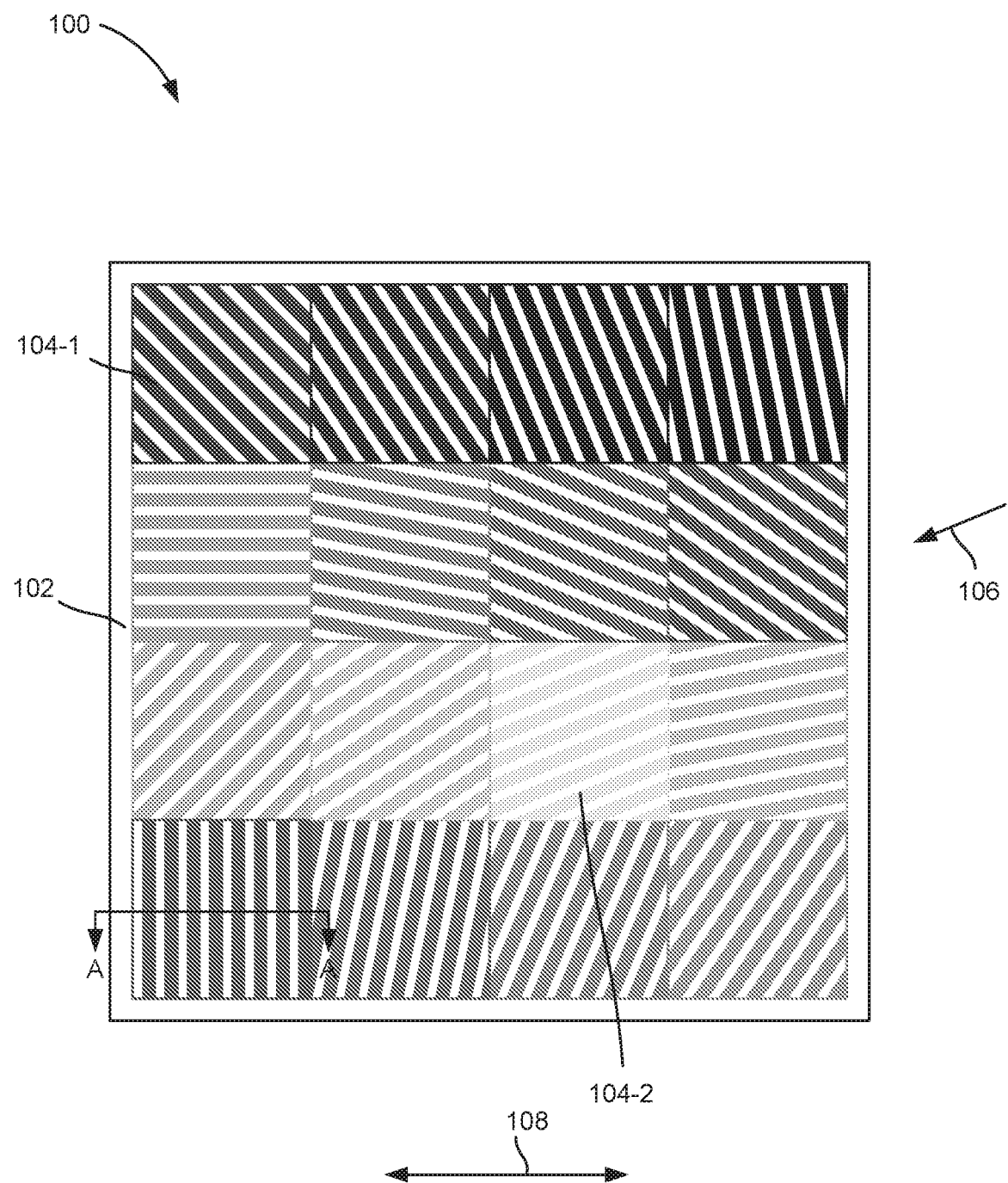
FIG. 1 is a diagram of three-dimensional illumination chart, according to an example of the principles described herein.

In photography and digital arts, accurate color reproduction is valuable to ensuring a quality finished product. Additionally, properly using and manipulating lighting can make a difference between a great picture and a good picture. Illumination charts are used to characterize the color reproduction of imaging systems. Illumination charts can also in some instances attempt to characterize an illuminant. For example photographers and digital artists use color charts to test the reproduction of various colors. Such charts are used in physical photography and can also be used in the digital arts. For example, digital graphic artists rely on models that indicate lighting and color characteristics of a particular scene to aid them in generating a more realistic digital image. While such illumination charts can be helpful, some characteristics impede their more integrated implementation.

For example, mirrored spheres may be used to capture the illumination properties of a scene for specific rendering purposes. Recently, models of these color charts and models of such mirrored spheres have been implemented in electronic devices, such as via mobile phone apps. However, these mirrored spheres reflect an image of captured light, not emitted light, and in the physical implementation can be bulky and not well-suited to be carried around. Such mirrored spheres also are limited in their use as they do not accurately characterize illumination in diffuse conditions.

Still further, in some examples, the illumination charts are planar and white. A planer and white patch, even having an identified reflectance, does not provide much detail about an angular orientation of illuminants in the scene. Moreover, these charts may rely on the mistaken assumption that the illumination of the chart is the same as the illumination of the objects of interest. The accuracy of such charts, and their overall effectiveness is reduced as a scene approaches ideal situations. For example, in ideal conditions, the illumination source is diffuse. The diffuse light makes the charts and mirrored spheres harder to implement. Moreover, such charts can be unable to determine whether light is diffuse or not.

Accordingly, the present specification describes a three-dimensional illumination chart and method for using the three-dimensional illumination chart that address this and other concerns. Specifically, the illumination chart includes three-dimensional reliefs of varying orientation to analyze the illumination for a given scene. Specifically, the magnitude of the contrast of the relief patterns is used to estimate an angular orientation of the illuminant.

Specifically, the three-dimensional illumination chart includes a substrate that is divided into a number of portions. Each portion includes a raised relief pattern. The raised relief pattern is disposed at a relief angle relative to a reference line. Each of the relief patterns found in the different portions have a different relief angle relative to one another. Accordingly, when illuminated by at least one illuminant, each relief pattern casts a shadow having unique and distinct characteristics relative to the shadows cast by reliefs on other portions. The different shadows are unique at least in regard to magnitude and chroma value. The portion of the substrate with the least amount of shadow indicates an illumination direction of the at least one illuminant.

According to a method for determining an illumination angle, luminance data for multiple portions of the three-dimensional illumination chart that are illuminated by at least one illuminant is received. A luminance range for each of the multiple portions is determined and an illumination angle is indicated. The illumination angle corresponds to the relief angle of the portion with the minimum luminance range.

In summary, the three-dimensional illumination chart described herein can be captured with an imaging device and patterns of contrast are used to characterize the angular orientation and properties of illuminants in the scene, which number of illuminants may be greater than one. This information can be used to achieve a specific desired illumination, such as more diffuse illumination of an object during three-dimensional scanning, or to compute corresponding corrections to the captured data such as white balancing and contrast correction. The enhanced detection of illumination direction also facilitates accurate combining of a set of images into a new image and for adding rendered objects into images.

Such a chart and method 1) is simple to use and can be understood visually or using an imaging device; 2) allows for detection of illumination angle and degree of light diffusion; 3) can be used to determine a most diffuse location within a region 4) is adjustable with different heights, spacing, and shapes for the relief pattern facilitating different applications; 5) can assess illumination angle for multiple illuminants; and 6) detects illumination based on shadows corresponds with illumination detection mechanisms of the human visual system. However, it is contemplated that the devices disclosed herein may provide useful in addressing other matters and deficiencies in a number of technical areas. Therefore, the systems and methods disclosed herein should not be construed as addressing any of the particular matters.

As used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

FIG. 1 is a diagram of a three-dimensional illumination chart (100) for determining illumination directions, according to an example of the principles described herein. In use, the three-dimensional illumination chart (100) is placed in a scene being illuminated from a particular direction, which direction is indicated by the arrow (106). The three-dimensional illumination chart (100) is used to determine this illumination direction. While FIG. 1 depicts a single illumination direction, as will be described below, the three-dimensional illumination chart (100) could be used to identify multiple illumination directions corresponding to multiple illuminants.

The illumination chart (100) includes a substrate (102). The substrate (102) may be formed of any material such as a plastic material. The substrate (102) may be a low-gloss material. Were it constructed out of a high-gloss material, reflections off the surface could obfuscate and offset the contrast within a particular portion (104). In some examples, the substrate (102) and corresponding raised relief pattern is 3D-printed from a bed of powdered build material.

The substrate (102) is divided into various portions (104). While FIG. 1 depicts 16 different portions (104), the substrate (102) can be divided into any number of portions (104). For simplicity, in FIG. 1, a few portions (104-1, 104-2) are indicated with a reference number, however each of the portions (104) may include similar characteristics, i.e., raised pattern at a particular relief angle.

Each of the portions (104) includes a raised relief pattern, such that the illumination chart (100) is three-dimensional. Each of the portions (104) may contain the same raised relief pattern, but orientated at different angles relative to a reference line (105). As such, when illuminated by an illuminant, each portion (104) will cast a different shadow, i.e., different direction and contrast, based on the differing relief angles. In FIG. 1, the different shadows cast by the different portions (104) are represented with different shades of black. Shadows with higher contrast are depicted with darker shades of black. For example, those portions (104) casting the greatest shadow, i.e., those shadows with the highest contrast are represented by the darkest black. By comparison, those portions (104) casting the least shadow, i.e., those with the shadow with the least contrast, are represented by the lightest shadow. The gradient from darkest black to lightest gray represent discretized shadows having different levels of intermediate contrast. In this example, the portion (104) that has the least amount of shadow, i.e., the portion (104-2) with the least amount of contrast between an illuminated surface and a shadowed surface, indicates the illumination direction of the at least one illuminant.

In some examples, the difference between the relief angle of subsequent portions (104) may be a set value. For example, the difference in angle between adjacent portions (104) may be approximately 11.25 degrees representing a discrete representation of 180 degrees amongst the 16 portions (104). While FIG. 1 depicts discrete angle measurements in some examples, the portions (104) may form a continuous spectrum. For example, the portions (104) could be arranged as a spiral, circle or other shape with varying angles.

The number of portions (104), difference in angle of relative portions (104), and the granularity of the resultant data may depend on the type of application. For example, on a larger scale a courser granularity may be permissible as opposed to micro-scale illumination analysis which may justify a finer granularity, i.e., more portions (104) with smaller angle deltas.

The illumination chart (100) described herein can be used to robustly determine illumination direction of one illuminant as well as additional illuminants. For example, as described in an example below, the illumination chart (100) may be illuminated by two illuminants having different chromacity. In this case, the illumination chart (100) could be used to determine the illumination direction of both illuminants. Also, the illumination chart (100) is robust in that it can determine illumination direction for a highly-directional illuminant as well as a diffuse illuminant.

The illumination chart (100) can also be used to determine the diffusion of a particular environment. For example, diffusion can be determined based on the difference in luminance ranges for the different portions (104). The smaller the difference in luminance range across the entire illumination chart (100), the more diffuse the particular environment.

The illumination chart (100) as described herein can be used in many applications. For example, photographers could place the illumination chart (100) in a lighted scene such as a photography studio, stage, or light box where a photograph will be taken. The illumination chart (100) could then be used to determine the angle of illumination. In another example, the illumination chart (100) can also be used in post-processing operations. For example, in some cases, a digital artist may desire to increase illumination. Using data from the illumination chart (100), an artist may be able to properly increase illumination so as to not over-illuminate incorrect areas.

In another example of digital use, contrast can be corrected in digital photographs to enhance the quality of the image. Specifically, with the enhanced information generated by the illumination chart (100) a more accurate configuration of the lighting system is generated thereby resulting in more accurate contrast correction.

In still another example, a digital artist may desire to add a rendered object into a photographic scene. In so doing, the lighting characteristics of the scene aid a digital artist in altering the rendered object in order to make its light match that of the photographic scene. The illumination chart (100) with its enhanced light detecting properties can enhance and simplify a digital artists renderings. Other types of post-processing operations can be enhanced using the increased lighting information provided by the three-dimensional illumination chart (100) as it allows for more information regarding illumination to be gathered, which increased illumination information enhances the digital media and visual arts genres.

While specific examples have been presented regarding how the information from the illumination chart (100) can be used. Any operation, including computer-aided graphic design, would benefit from more accurate information regarding an illuminant including the direction of the illumination and the diffusion of the illuminating light. Put another way, the 3D illumination chart (100) described herein allows for enhanced illuminant analysis. First the angular orientation of physical and/or virtual illuminants can be estimated using the resulting contrast signals produced by the imaged chart. Then a measure of diffuseness of illumination can be computed from the degree of contrast across the whole imaged chart.

Figure 2:
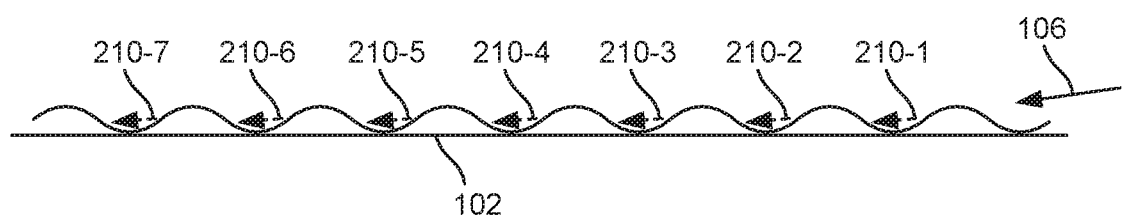
FIG. 2 is a cross-sectional diagram of one portion of the three-dimensional illumination chart, according to an example of the principles described herein.

FIG. 2 is a cross-sectional diagram of one portion (FIG. 1, 104) of the three-dimensional illumination chart (FIG. 1, 100), according to an example of the principles described herein. Specifically, FIG. 2 is a cross-sectional diagram along the line "A-A" from FIG. 1. As described above, the portions (FIG. 1, 104) may include a relief pattern that raises above the surface of the substrate (102). For example, as depicted in FIG. 2, the raised relief pattern may be a sinusoidal pattern. While FIG. 2 depicts a sinusoidal pattern, any type relief pattern may be implemented in accordance with the principles described herein including a triangular cross-section, a square cross section, a lenticular cross-section, or having a cross-section of a different shape.

As illustrated in FIG. 2, the reliefs of the portion (FIG. 1, 104) are illuminated from an illumination direction (106) which causes each individual relief to cast a shadow (210). Due to their differing angles relative to the illuminant, each portion (FIG. 1, 104) casts shadows having different intensity. Depending on the intensity of the cast shadows, a system can determine the direction of the illuminant.

The amplitude and frequency of the reliefs may vary and the values of those components may depend on the application for the illumination chart (FIG. 1, 100). For example, if the illuminant is to detect micro cracks, it may be desirable to have a fine-tuned indication of light direction. As such the height and length of each individual relief may be smaller, than for example, analysis on a macro scale.

Figure 3:
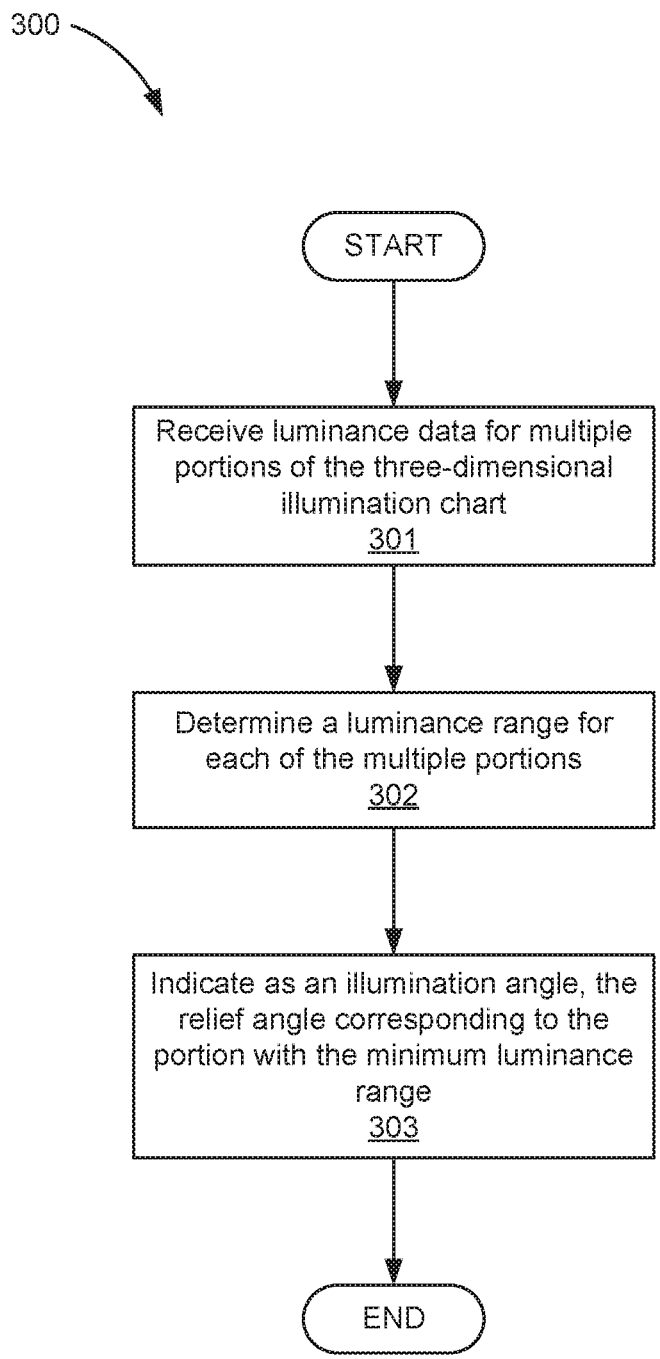
FIG. 3 is a flowchart illustrating a method for determining an illumination angle using a three-dimensional illumination chart, according to an example of the principles described herein.

FIG. 3 is a flowchart of a method (300) for determining illumination direction of an illuminant. As a general note the methods (300, 500) may be described below as being executed or performed by at least one device, for example, the imaging device described in FIG. 4. Other suitable systems and/or computing devices may be used as well. The methods (300, 500) may be implemented in the form of executable instructions stored on at least one machine-readable storage medium of at least one of the devices and executed by at least one processor of at least one of the device, Alternatively, or in addition, the methods (300, 500) may be implemented in the form of electronic circuitry (e.g., hardware). While FIGS. 3 and 5 depict operations occurring in a particular order, a number of the operations of the methods (300, 500) may be executed concurrently or in a different order than shown in FIGS. 3 and 5. In some examples, the methods (300, 500) may include more or less operations than are shown in FIGS. 3 and 5. In some examples, a number of the operations of the methods (300, 500) may, at certain times, be ongoing and/or may repeat.

According to the method (300), luminance data for multiple portions (FIG. 1, 104) of the three-dimensional illumination chart (FIG. 1, 100) is received (block 301). For example, as described above each portion (FIG. 1, 104) casts different shadows based on their distinct angles relative to the illuminant. Accordingly, each portion (FIG. 1, 104) has different luminance data. As used in the present specification and in the appended claims, the term luminance data refers to data that reflects the luminance, or the intensity of light. The region within a portion (FIG. 1, 104) having the stronger shadow, would have a lower luminance relative to the rest of that particular portion (FIG. 1, 104), while a region within a portion (FIG. 1, 104) being the more strongly illuminated would have the higher luminance for the particular portion (FIG. 1, 104) relative to the rest of that particular portion (FIG. 1, 104). Accordingly, luminance data for a particular portion (FIG. 1, 104) could indicate the spectrum of illuminance for that particular portion (FIG. 1, 104). Accordingly, luminance data for the multiple portions (FIG. 1, 104) may include data, sorted by portion (FIG. 1, 104), indicating what luminance values are found within that particular portion (FIG. 1, 104).

Using the luminance data, a processor of the imaging device can determine (block 302) a luminance range for each of the multiple portions (FIG. 1, 104). For example, as will be described below, a lower limit of the luminance range may be the $5^{th}$ percentile luminance value for a portion (FIG. 1, 104) and the upper limit of the luminance range may be the $95^{th}$ percentile luminance value or a portion (FIG. 1, 104). An indication is then made (block 303) regarding the illumination direction. More specifically, a relief angle corresponding to a portion (FIG. 1, 104) with the smallest luminance range for the plurality of portions (FIG. 1, 104) is identified as the illumination direction. As a specific example, say a second portion (FIG. 1, 104-2) is determined to have the smallest luminance range of the multiple portions (FIG. 1, 104) and has a relief angle of approximately 22.5 degrees relative to the reference line (FIG. 1, 105). The illumination direction can then also be quantified as approximately 22.5 degrees relative to the reference line (FIG. 1, 105).

Accordingly, in this fashion using a level of contrast or illuminance, a robust, effective, and correct identification of an illumination direction can be made. As light is a valuable element in many photographic, videographic, and digital imaging operations, the information regarding illumination direction could enhance developments and work product in at least each of these areas.

As an additional note, the method (300) and illumination chart (FIG. 1, 100) can be used in more diffuse situations as well. For example, when placed in a light box where light is more diffuse and less directional, differences in luminance ranges still exist, albeit on a narrower scale. Due to the existence of such differences in luminance, a processor can still determine the direction of illumination using the illumination chart (FIG. 1, 100) described above, notwithstanding the increased general diffusion of light.

Figure 4:
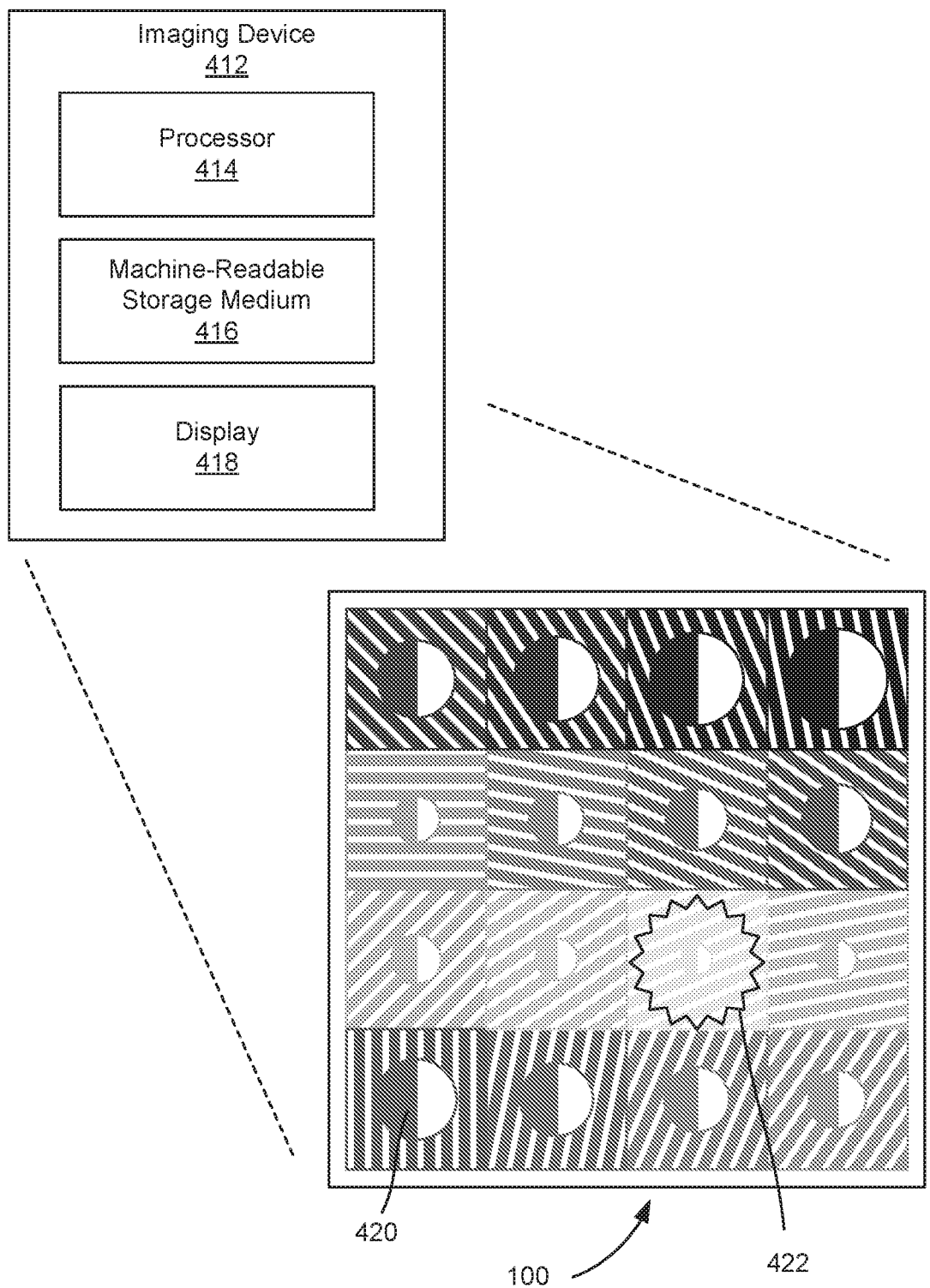
FIG. 4 is a diagram of an environment for determining illumination angle using a three-dimensional illumination chart.
Figure 5:
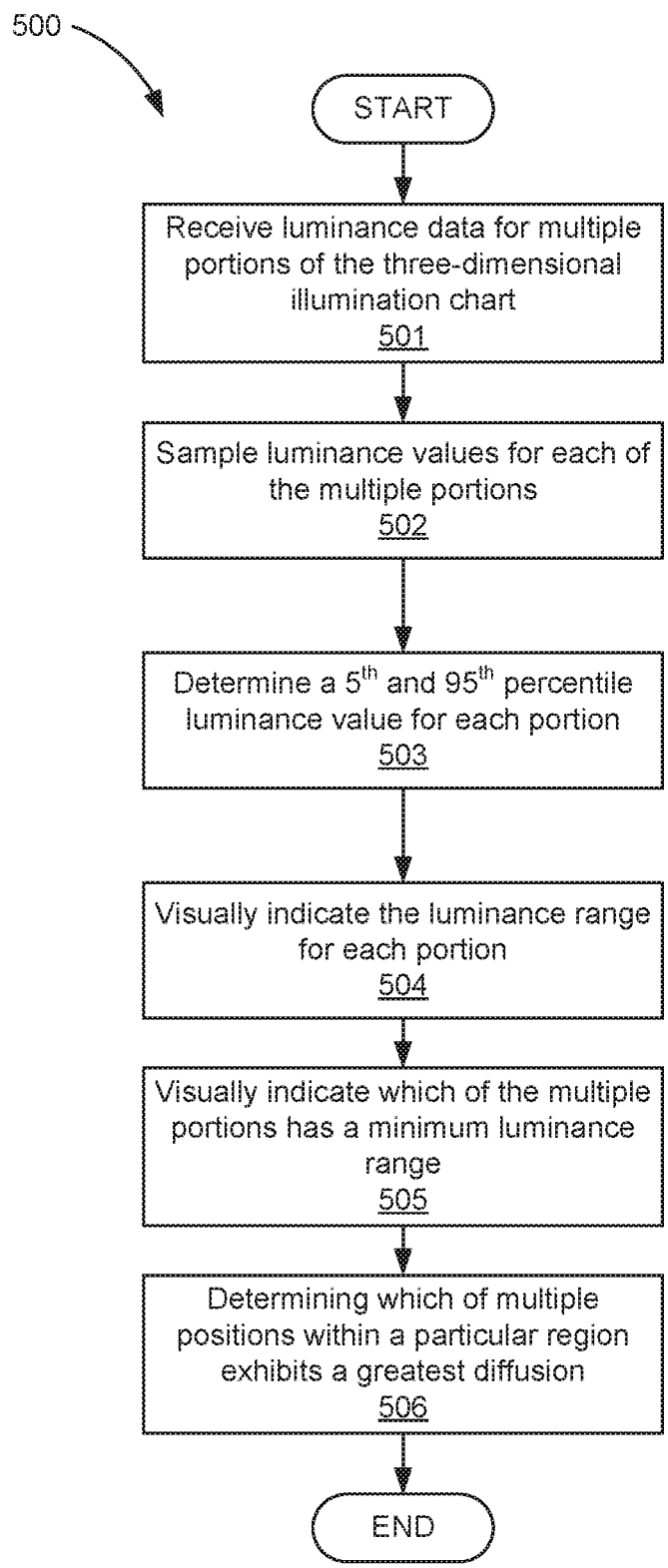
FIG. 5 is a flowchart illustrating a method for determining an illumination angle using a three-dimensional illumination chart, according to another example of the principles described herein.

FIG. 4 is a diagram of an environment for determining illumination direction using a three-dimensional illumination chart (100). In the environment, an imaging device (412) captures an image of the illumination chart (100) as it is illuminated in a scene. To carry out various functions in determining an illumination direction, the imaging device (412) includes a processor (414) and machine-readable storage medium (416) coupled to the processor (414). Although the following descriptions refer to a single processor (414) and a single machine-readable storage medium (416), the descriptions may also apply to a computing device (412) with multiple processors and multiple machine-readable storage mediums. In such examples, the instructions may be distributed (e.g., stored) across multiple machine-readable storage mediums and the instructions may be distributed (e.g., executed by) across multiple processors.

The processor (414) may include other resources used to process programmed instructions. For example, the processor (414) may be a number of central processing units (CPUs), microprocessors, and/or other hardware devices suitable for retrieval and execution of instructions stored in machine-readable storage medium (416). In the imaging device (412) depicted in FIG. 4, the processor (414) may fetch, decode, and execute instructions to determine an illumination direction using a three-dimensional illumination chart (100). As an alternative or in addition to retrieving and executing instructions, the processor (414) may include a number of electronic circuits comprising a number of electronic components for performing the functionality of a number of the instructions in the machine-readable storage medium (416). With respect to the executable instruction representations (e.g., boxes) described and shown herein, it should be understood that part or all of the executable instructions and/or electronic circuits included within one box may, in alternate examples, be included in a different box shown in the figures or in a different box not shown.

The machine-readable storage medium (416) represent generally any memory capable of storing data such as programmed instructions or data structures used by the computing device (412). The machine-readable storage medium (416) includes a machine-readable storage medium that contains machine readable program code to cause tasks to be executed by the processor (414). The machine-readable storage medium (416) may be tangible and/or non-transitory storage medium. The machine-readable storage medium (416) may be any appropriate storage medium that is not a transmission storage medium. For example, the machine-readable storage medium (416) may be any electronic, magnetic, optical, or other physical storage device that stores executable instructions. Thus, machine-readable storage medium (416) may be, for example, Random Access Memory (RAM), an Electrically-Erasable Programmable Read-Only Memory (EEPROM), a storage drive, an optical disc, and the like. The machine-readable storage medium (416) may be disposed within the imaging device (412), as shown in FIG. 4. In this situation, the executable instructions may be "installed" on the imaging device (412). Alternatively, the machine-readable storage medium (416) may be a portable, external or remote storage medium, for example, that allows the imaging device (412) to download the instructions from the portable/external/remote storage medium. In this situation, the executable instructions may be part of an "installation package". As described herein, the machine-readable storage medium (416) may be encoded with executable instructions for dual-power reception.

Referring to FIG. 4, the instructions stored in the machine-readable storage medium (416) may include instructions that when executed by the processor (414) cause the processor (414) to carry out the method operations described above in FIG. 3 and below in FIG. 5.

In some examples, the processor (414) and machine-readable storage medium (416) are located within the same physical component, such as a server, or a network component. The machine-readable storage medium (416) may be part of the physical component's main memory, caches, registers, non-volatile memory, or elsewhere in the physical component's memory hierarchy. Alternatively, the machine-readable storage medium (416) may be in communication with the processor (414) over a network. Thus, the imaging device (412) may be implemented on a user computing device, on a server, on a collection of servers, or combinations thereof.

The imaging device (412) of FIG. 4 may be part of a general purpose computer. However, in alternative examples, the imaging device (412) is part of an application specific integrated circuit.

In some examples, the imaging device (412) includes a display (418). Examples of such displays include a display screen on a mobile device, a liquid crystal display (LCD), a light-emitting diode (LED) display among others. Via the display information regarding the luminance ranges for the various portions can be displayed, and accordingly an indication as to the direction of the illumination.

Via the display (418), the imaging device (412) may present a model of the illumination chart (100) including information indicating the illumination direction. For example, an overlay image can be displayed on top of the model of the illumination chart (100). The overlay image may identify the contrast within each portion (FIG. 1, 104). For example, a luminance range indicator (420) can be overlaid each portion (FIG. 1, 104) on the illumination chart (100). For simplicity a single illuminance range indicator (420) is identified in FIG. 4 by a reference number. However other instances of the luminance range indicator (420) may be overlaid the illumination chart (100).

The luminance range indicator (420) may be color-coded to identify the luminance range of a portion (104). For example, a color corresponding to the $5^{th}$ percentile luminance value is displayed on the left and the $95^{th}$ percentile luminance value is displayed on the right. Furthermore, the luminance range indicator (420) may further indicate the range of the luminance for a particular portion (FIG. 1, 104). As a specific example, the radius of the luminance range indicator (420) may be the square-root of the luminance difference between the $95^{th}$ percentile and the $5^{th}$ percentile. Accordingly, the smaller the radius of the luminance range indicator (420), the lower the luminance contrast, and the larger the radius of the luminance range indicator (420), the greater the luminance contrast for the corresponding portion (FIG. 1, 104). As such, the portion (FIG. 1, 104) with the minimum luminance difference relative to other portions (FIG. 1, 104) of the chart (100), i.e., the smallest luminance range indicator (FIG. 4, 420), may be indicated as the portion (FIG. 1, 104) that includes a relief angle that corresponds to the luminance direction. The portion (FIG. 1, 104) with the minimum luminance difference, and thereby that identifies the illumination direction, can also be identified via an overlay. For example, an illumination direction indicator (422) could be used to specifically identify that portion (FIG. 1, 104) that most closely indicates the illumination direction.

Note that the example provided in FIG. 4 regarding the configuration of the overlay and to indicate luminance range and the portion (FIG. 1, 104) with the lowest luminance range and their corresponding identifiers is an example and other indicial of luminance range, and illumination angle may be implemented in accordance with the principles described herein.

FIG. 5 is a flowchart illustrating a method (500) for determining an illumination direction using a three-dimensional illumination chart (FIG. 1, 100), according to another example of the principles described herein. According to the method (500), luminance data for multiple portions (FIG. 1, 104) of the three-dimensional illumination chart (FIG. 1, 100) are received (block 501). This may be performed as described above in connection with FIG. 3.

Then, as described above, luminance ranges for each of the multiple portions (FIG. 1, 104) may be determined. This may include sampling (block 502) luminance values for each of the multiple portions (FIG. 1, 104). Specifically, the entire portion (FIG. 1, 104) may be sampled, or as in some examples, a region of the portion (FIG. 1, 104), such as a 50 pixel by 50 pixel region is sampled. From this sampling, a $5^{th}$ percentile and $95^{th}$ percentile luminance value for each portion (FIG. 1, 104) is determined (block 503). The $5^{th}$ percentile luminance value refers to a luminance value of which 5 percent of luminance values for that portion (FIG. 1, 104) are lower, i.e., they are more black. By comparison, the $95^{th}$ percentile luminance values refers to a luminance value whose value is greater than 95 of the luminance values for that portion (FIG. 1, 104), i.e., more white. The difference between these $5^{th}$ and $95^{th}$ percentile values is then calculated and reported as a luminance range for each portion (FIG. 1, 104).

With this information in hand, the imaging device (FIG. 4, 412) can indicate the illumination direction. Specifically, the imaging device (FIG. 4, 412) can visually indicate (block 504) the luminance range of each of the multiple portions (FIG. 1, 104). In one specific example, this may include an overlay for each portion (FIG. 1, 104) where one part of a luminance range indicator (FIG. 4, 420) displays with the $5^{th}$ percentile luminance shade and another part displays the $95^{th}$ percentile luminance shade for the portion (FIG. 1, 104). Doing so may allow a user a more simply determine the luminance range as well as the more general illumination direction. Also in this example, the luminance range indicator (FIG. 4, 420) for each portion (FIG. 1, 104) may indicate the difference between the $5^{th}$ percentile and the $95^{th}$ percentile. In a specific example, those portions (FIG. 1, 104) having a smaller luminance range are identified with a luminance range indicator (FIG. 4, 420) having a smaller diameter. As indicated above, while one specific example of an overlay is presented as a method for visually indicating the luminance range, any type of visual cue may be used in accordance with the principles described herein.

In addition to visually indicating (block 504) the luminance range for each portion (FIG. 1, 104), the imaging device (FIG. 4, 412) can visually indicate (block 505) which of the multiple portions (FIG. 1, 104) has the lowest luminance range. Using the example from above, this may be done by highlighting the portion (FIG. 1, 104) with the smallest range with an illumination direction indicator (FIG. 4, 422). This may be done by any visual cue including an icon, highlighting a particular portion (FIG. 1, 104), or other visual cue.

In some examples, in addition to indicating an illumination direction, the system can indicate a most diffuse position within a particular region. For example, even when in a diffuse scene such as a light box, some spatial variation still occurs regarding directional light. In this and other cases, a most diffuse region can be identified. To do so, the illumination chart (FIG. 1, 100) is moved to different positions within the region. At each position, the $5^{th}$ and $95^{th}$ percentile is calculated for each portion (FIG. 1, 104) of the illumination chart (FIG. 1, 100). Then the imaging device (FIG. 4, 412) can identify that portion (FIG. 1, 104) from the multiple portions that has the greatest luminance range, i.e., the greatest difference between a $5^{th}$ and $95^{th}$ percentile value, and that portion (FIG. 1, 104) that has the lowest luminance range, i.e., the least difference between a $5^{th}$ and $95^{th}$ percentile value. A global luminance range can then be identified for the illumination chart (FIG. 1, 100) and defined as the difference between the greatest luminance range and the lowest luminance range. With such a global luminance range calculated for the illumination chart (FIG. 1, 100) at each position, the position with the lowest global luminance range is identified as the region of greatest diffusion. In other words, as diffusion refers to light that is less directional, a diffuse lighting scenario will tend to have luminance ranges that are narrower.

The methods (300, 500) described herein can also be used to indicate illumination direction of multiple illuminants having different chromacity, or different color. For example, an illumination (FIG. 1, 100) chart illuminated by a red light source and a green light source can be used to determine the illumination direction of each source, individually. In this example, with multiple illuminants the perceived or captured illumination chart (FIG. 1, 100) will have more than one orientation with low contrast and the amplitude chromaticity properties of the peaks or brightest portions of the sinusoid will vary depending on which illuminant is more strongly lighting a particular portion (FIG. 1, 104). With this knowledge in hand, a waveform reconstruction can be performed to determine the illumination direction of the two illuminants.

Moreover, the methods (300, 500) described herein can be used analyze physical or virtual illumination. For example, a virtual environment, a scene in a 3D model viewer, or a part displayed by a computer-aided drafting (CAD) application, may include a range of computational lighting models in addition to the creation and editing of 3D objects. The 3D illumination chart (FIG. 1, 100) as described herein can be recreated in such a scene and subjected to various virtual illuminant functions similarly to how it may be done in a physical scene. Accordingly, it is possible to infer the angular orientation of virtual illuminants via contrast processing as described above.

Such a chart and method 1) is simple to use and can be understood visually or using an imaging device; 2) allows for detection of illumination angle and degree of light diffusion; 3) can be used to determine a most diffuse location within a region 4) is adjustable with different heights, spacing, and shapes for the relief pattern facilitating different applications; 5) can assess illumination angle for multiple illuminants; and 6) detects illumination based on shadows corresponds with illumination detection mechanisms of the human visual system. However, it is contemplated that the devices disclosed herein may provide useful in addressing other matters and deficiencies in a number of technical areas. Therefore, the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A three-dimensional illumination chart, comprising:
   a substrate divided into a number of portions, wherein each portion comprises a raised relief pattern disposed thereon, wherein relief elements of each relief pattern are arranged having a relief angle relative to a reference line,
   wherein each relief angle of the raised relief patterns of the number of portions is different from other relief angles of other raised relief patterns of other portions such that the relief pattern of each portion of the number of portions casts a unique shadow with respect to a common illuminant;

wherein a difference between each pair of subsequent relief angles is a set value.

2. The chart of claim 1, wherein each raised relief pattern is a repeating pattern.

3. The chart of claim 1, wherein at least one of the raised relief patterns has a sinusoidal cross-sectional area across a series of the relief elements of the at least one raised relief pattern.

4. The chart of claim 1, wherein the substrate is a low-gloss material.

5. The chart of claim 1, wherein the relief elements of adjacent portions are continuous.

6. The chart of claim 1, wherein a difference between the relief angles of any two of the raised relief portions is a multiple of a set value.

7. The chart of claim 1, wherein the relief elements of each portion comprise elongated, parallel ridges arranged along the relief angle corresponding to each portion.

8. The chart of claim 1, wherein the relief pattern of each portion of the number of portions is the same pattern, but oriented at a different relief angle.

9. A method of determining illumination angle using a three-dimensional illumination chart, the method comprising:
receiving luminance data for multiple portions of a three-dimensional illumination chart that is illuminated by at least one illuminant, each portion comprising a raised relief pattern having a relief angle that is unique from other relief angles of other raised relief patterns of other portions;
determining a luminance range for each of the multiple portions; and
indicating as an illumination angle, the relief angle corresponding to the portion with the lowest luminance range.

10. The method of claim 9, further comprising determining which of the multiple portions has the lowest luminance range.

11. The method of claim 9, wherein determining a luminance range for each of the multiple portions comprises:
sampling luminance values for each of the multiple portions; and
determining a $5^{th}$ and $95^{th}$ percentile luminance values for each portion.

12. The method of claim 9, further comprising:
visually indicating the luminance range of each of the multiple portions; and
visually indicating which of the multiple portions has the lowest luminance range.

13. The method of claim 9, further comprising determining which of multiple positions within a particular region exhibits a greatest diffusion.

14. The method of claim 13, wherein determining which of multiple positions within a particular region exhibits the greatest diffusion comprises:
for each of the multiple positions, determining a global luminance range for the illumination chart, the global luminance range being bound by the greatest luminance range and the lowest luminance range for the multiple portions;
indicating as the position with the greatest diffusion, the position that has the lowest global luminance range.

15. The method of claim 9, further comprising displaying a model of the illumination chart with a luminance range indicator display in associated with each of the multiple portions of the chart on the displayed model.

16. The method of claim 15, further comprising displaying on the model a visual cue indicating the portion of the multiple portions of the chart that has the lowest luminance range.

17. A three-dimensional illumination chart, comprising:
a substrate divided into a number of portions;
a number of raised relief patterns to indicate an illumination direction of at least one illuminant, each raised relief pattern being disposed on one of the number of portions of the substrate, wherein;
each raised relief pattern casts a unique shadow when illuminated by the at least one illuminant by being disposed at a distinct relief angle relative to other raised relief patterns of other of the number of portions; and
the portion with the least amount of shadow indicates an illumination direction of the at least one illuminant.

18. The chart of claim 17, wherein the number of raised relief patterns are to indicate an illumination direction of multiple illuminants.

19. The chart of claim 17, wherein the number of raised relief patterns are to indicate a presence of at least one diffuse illuminant.

* * * * *